May 2, 1933. M. KOVESDY 1,907,357
ELECTRIC HOT AIR FURNACE
Filed March 5, 1932 3 Sheets-Sheet 1
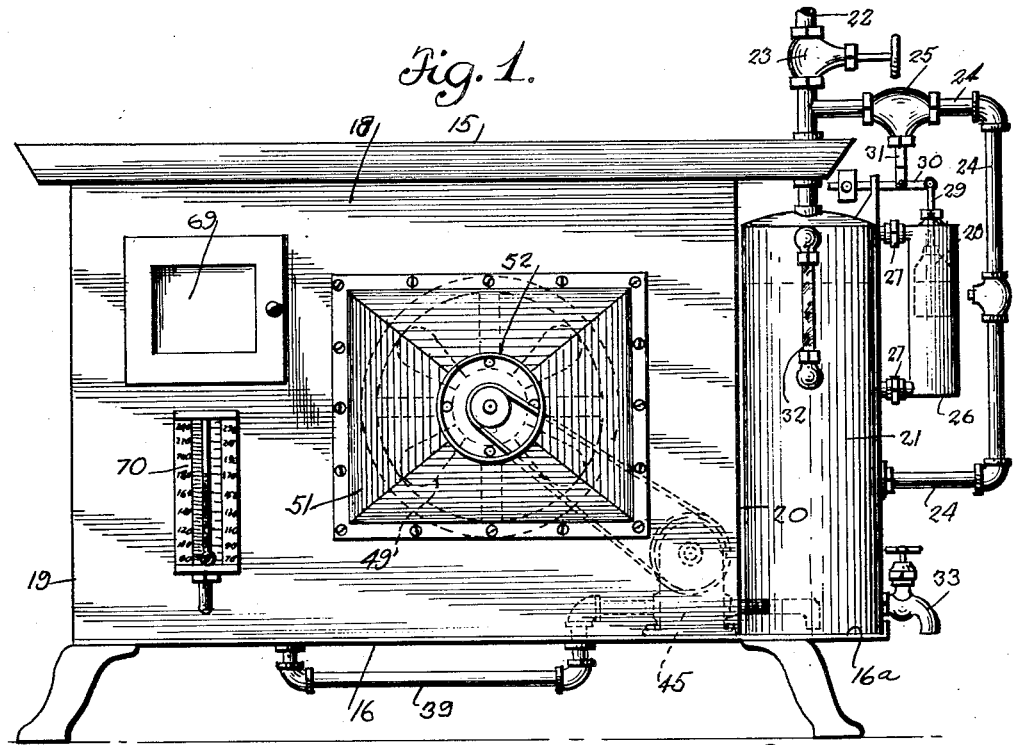
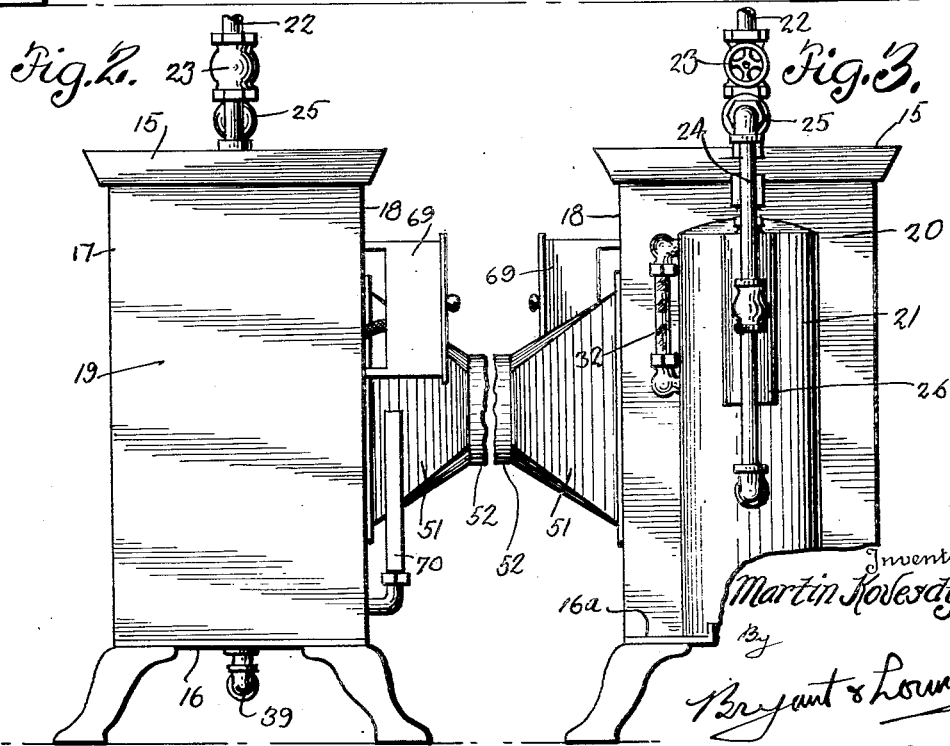
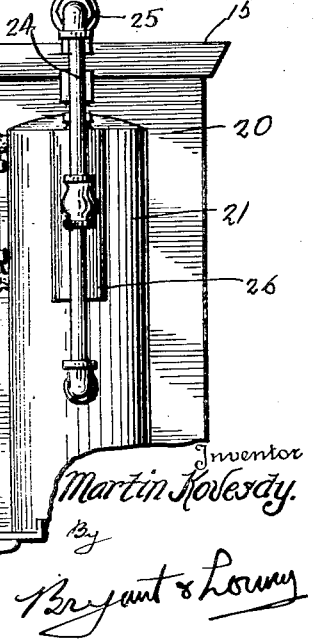
Inventor
Martin Kovesdy.

Inventor
Martin Kovesdy.

May 2, 1933. M. KOVESDY 1,907,357
ELECTRIC HOT AIR FURNACE
Filed March 5, 1932   3 Sheets-Sheet 3
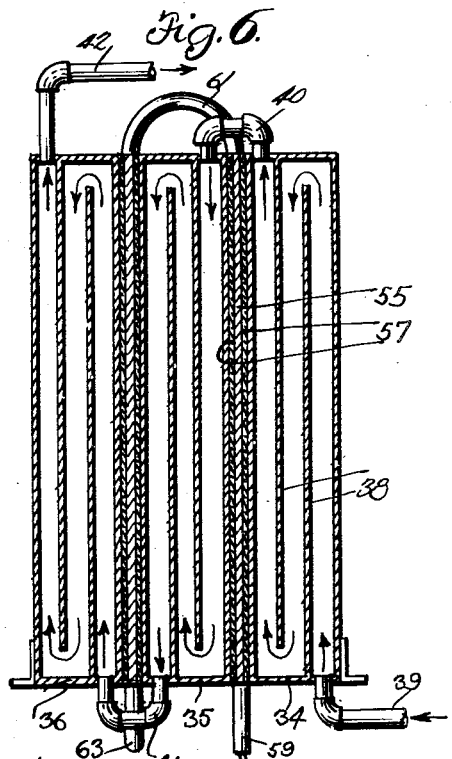
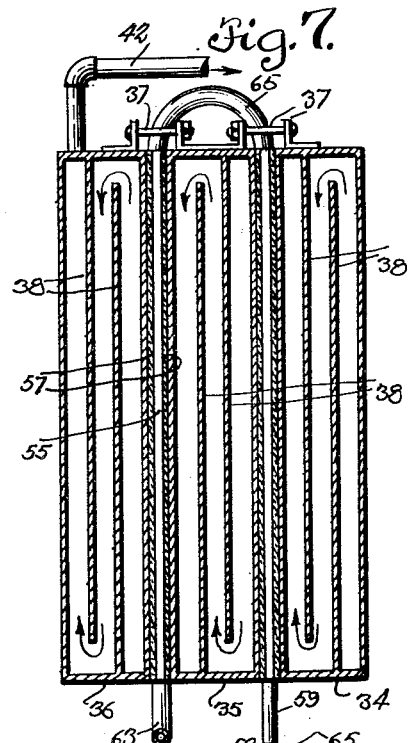
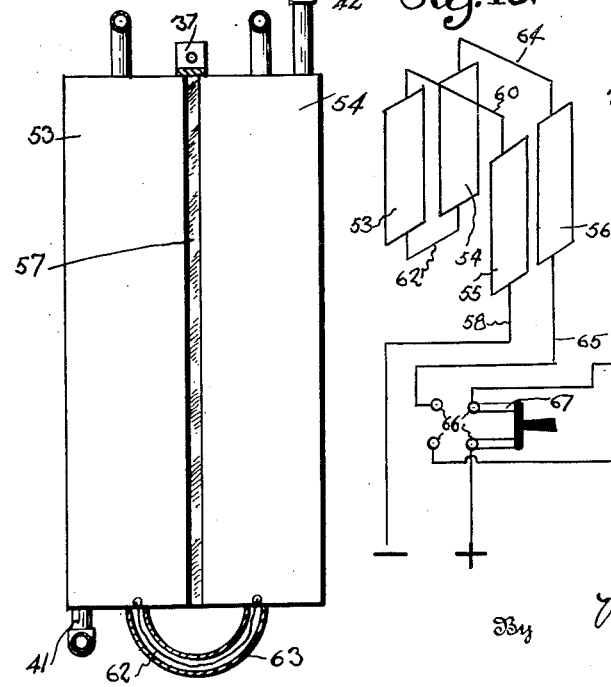
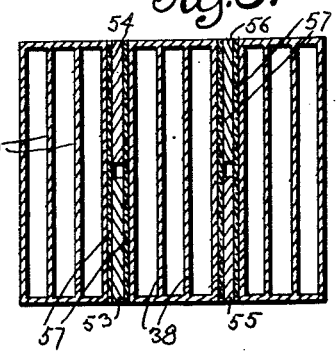

Patented May 2, 1933

1,907,357

UNITED STATES PATENT OFFICE

MARTIN KOVESDY, OF CLEVELAND, OHIO

ELECTRIC HOT AIR FURNACE

Application filed March 5, 1932. Serial No. 597,025.

This invention relates to certain new and useful improvements in electric hot air furnaces.

The primary object of the invention is to provide an electric hot air furnace wherein water is adapted to be circulated through electric heating devices and then directed through pipe coils with the motor operated fans associated with the pipe coils for drawing heated air therefrom and thereover for delivery into a room for the purpose of heating the same, or for directing the heated air through conduits or the like for the heating of remotely positioned chambers, or rooms.

It is a further object of the invention to provide an electric hot air furnace of the foregoing character embodying a water tank in communication with a water service pipe under control of a float operated valve so that sufficient quantity of water is maintained in the tank to be circulated through the electric heating devices, pipe coils and then returned to the tank.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a side elevational view of an electric hot air furnace constructed in accordance with the present invention, showing the fan blower and pump by dotted lines for circulating water from the end tank to the electric heater and pipe coils with the water supply means for the tank;

Figure 2 is an end elevational view of the apparatus;

Figure 3 is an opposite end elevational view;

Figure 6 is a detail sectional view taken on line 6—6 of Figure 5, showing the water circulating passages in the electric heater unit;

Figure 7 is a detail sectional view taken on line 7—7 of Figure 5, showing the electric heating devices interposed between sections of the water circulating means of the electric heater;

Figure 8 is a detail sectional view taken on line 8—8 of Figure 5, showing one of the electric heater units;

Figure 9 is a cross-sectional view of the electric heater unit; and

Figure 10 is a diagrammatic view of the wiring diagram, the heater unit, the water circulating motor and air suction fan.

Figure 4:
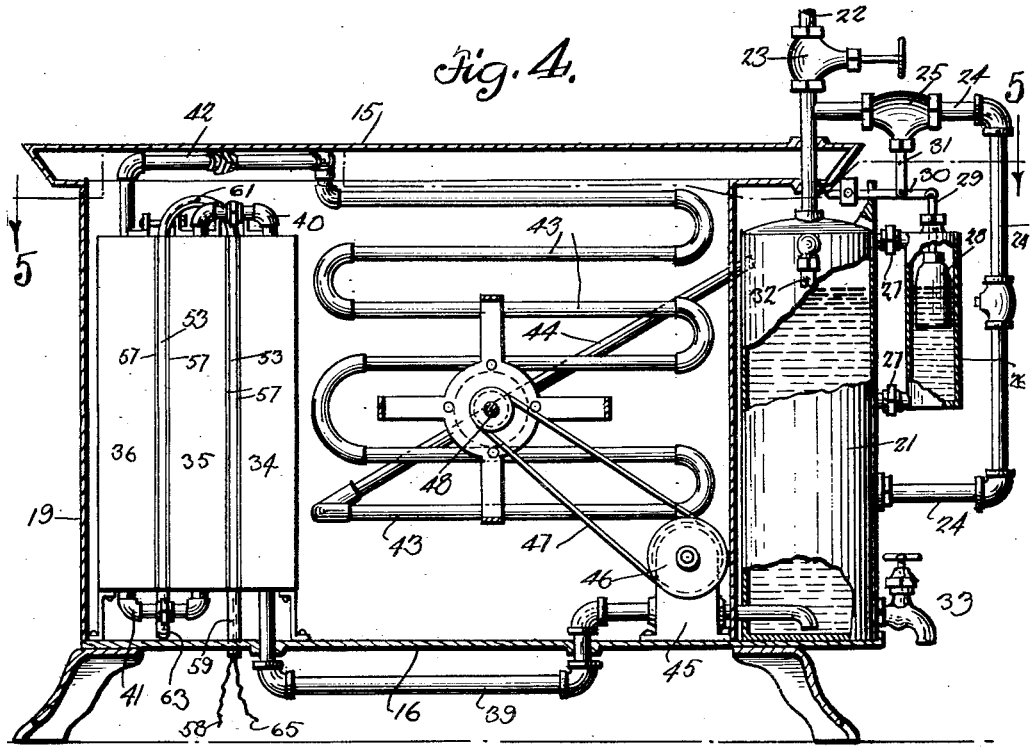
Figure 4 is a vertical longitudinal sectional view showing the electric heater unit, the water coil, water circulating pump, water tank and valve controlled supply means therefor.

Referring more in detail to the accompanying drawings, there is illustrated an electric hot air furnace comprising a casing, preferably of rectangular form having top and bottom walls 15 and 16, side walls 17 and 18 and end walls 19 and 20, the end wall 20 being set inwardly of the ends of the top and bottom walls as shown in Figures 1 and 2 to provide a support or platform 16a for a water tank 21.

Water delivered to the tank 21 is fed by means of a pipe to electric heating units and returns to the tank after passing through pipe coils with which a motor driven suction fan is associated for delivering heated air from the furnace casing for heating purposes, the water supply means for the tank 21 comprising a water service pipe 22 with a hand control valve 23 set therein, the pipe 22 being supported on the upper end of the tank 21, but out of communication therewith by means of a plug or stopper inserted in the pipe 22 below the valve 23. A branch pipe 24 of the pipe 22 is in communication with the tank 21 at a point adjacent to and spaced upwardly of the lower end of the tank, the flow of water through the pipe 24 is controlled by the float operated valve 25 set in the pipe 24. A float receptacle 26 in communication at its upper and lower ends with the tank 21 contains the float 28 that operates a rod 29 attached to a pivoted lever 30 that in turn is connected to the valve rod 31 of the valve 25, and it will be understood from an inspection of Figure 3 that when the water in the tank 21 and receptacle 26 reaches a predetermined level, the rise of the float 28 effects closing of the valve 25 for shutting off the supply of water to the tank 21. As shown in Figure 1, a water level gage glass 32 is associated with the upper end of the tank 21 for determining the water level in the tank. The lower end of the tank 21 is provided with a drain valve 33 for purposes of cleaning the tank when desired.

Figure 5:
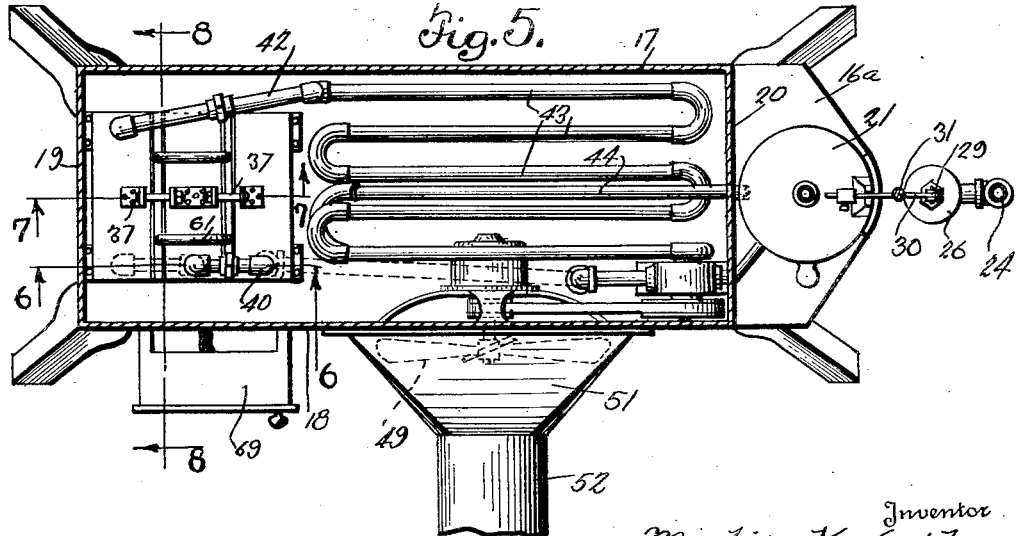
Figure 5 is a horizontal sectional view taken on line 5—5 of Figure 4.

An electric heater for water is arranged in the furnace casing adjacent the end wall 19 and is preferably formed of three units 34, 35 and 36 connected together by devices 37 at their upper ends as shown in Figures 5 and 7 and each of the units 34, 35 and 36 as shown in Figures 6 and 7 are in the form of chambers having staggered partitions 38 therein causing the water to flow in tortuous paths. The pipe 39 forms communication between the lower end of the tank 21 and the lower end of the outer end chamber in the heater unit 34 as shown in Figures 4 and 6, there being a pipe connection between the upper ends of adjacent chambers of the two sections 35 and 36 which are in communication by means of the pipe section 41. An outlet pipe 42 leads from the upper end of the outer end chamber of the heater unit 36 and is in communication with a series of pipe coils 43 within the furnace casing between the heater unit and the opposite end wall 20, the end coil of the pipe coils 43 having a diagonally disposed pipe 44 in communication with the upper end of the tank 21 for the return and circulation of heated water. The water flows under forced circulation by means of the motor operated pump 45 set into the pipe 39 and the shaft of the pump 45 carries a pulley 46 that has a belt connection 47 with the shaft 48 of a motor operated fan 49 equipped with an electric motor 50, the fan motor shaft 48 operating the pump 45. The side wall 18 of the furnace casing is provided with a relatively large opening alined with the heater coils 43 and said opening is covered by a hood 51 into which the fan wheel 49 is set and an outlet conduit 52, the fan operating to draw air within the furnace casing over the heater pipes 43 for discharging the heated air to the hood 51 and conduit 52.

The electric heating means is interposed between the heater units 34, 35 and 36, and are structurally shown in Figures 6 to 9 and diagrammatically illustrated in Figure 10, each heater element between the heater units consists of electric resistance plates 53—54 and 55—56. The electric resistance plates are insulated from the walls of the heater units by mica or other insulation plates 57. A wire 58 from the negative side of a source of potential passes through the conduit 59 and is in communication with the resistance plate 55, the upper end of the resistance plate 55 having a wire connection 60 extending through a conduit 61 and is connected to the upper end of the resistance plate 53. A wire 62 extending through the conduit 63 forms electrical connection between the lower ends of the resistance plates 53 and 54, while the wire 64 extending through the conduit 65 forms electrical communication between the upper ends of the resistance plates 54 and 56. The wire 65 connected to the lower end of the resistance plate 56 passes through the conduit 59 and leads to the positive side of the source of potential and has set therein switch terminals 66 closed by a switch 67 with wire connections 68 to the fan motor 50. It will therefore be seen that when the switch 67 is engaged with the switch terminals 66, current flows through the resistance plates 53—54, and 55—56, and also the fan motor 50. The switch mechanism is set into the switch box 69 carried by the side wall 18 of the furnace casing. A thermometer 70 carried by the wall 18 is in communication with the electric heater unit to give a reading of the temperature of the water flowing therethrough.

From the above detailed description of the invention, it is believed that the construction and operation thereof will at once be apparent, it being noted that when the switch 67 is engaged with the contact 66, the resistance plates in the heater unit effect heating of water tortuously flowing through the heater unit, the flow of water being impelled by the pump 45 that has a belt connection with the fan motor. The heated water passing out of the heater unit flows through the coils 43 and a suction fan 49 draws heated air thereover for discharge through the hood 51 and conduit 52. The constant level of water is maintained in the tank 21 by means of the float operated check valve 25 and the water circulating system including the tank 21, the temperature of the water is always comparatively high and is more quickly heated to the desired degree in its tortuous passage through the heater units before delivery to the heater coils.

While there is herein shown and described the preferred embodiment of the invention, it is nevertheless to be understood that minor changes may be made therein without departing from the spirit and scope of the invention as claimed.

I claim:—

1. An electric hot air furnace comprising a casing, a water tank located at one end of the casing and supported thereby and externally thereof, means for the supply of water to said tank and automatically controlling such supply, an electric heating unit in communication with said tank and located within said casing at one end thereof, a heater coil in said casing and between the tank and heating unit, a valve controlled water service pipe leading to the tank, the heating unit comprising a series of outer communicating sections vertically arranged with resistance heating plates located between the sections, means for electrically heating said plates and electrically operated means for promoting a circulation of air over said coil.

2. An electric hot air furnace according to claim 1 in which the casing has an external recess at one end for the reception and support of the water tank.

In testimony whereof I affix my signature.

MARTIN KOVESDY.